United States Patent Office 3,474,740
Patented Oct. 28, 1969

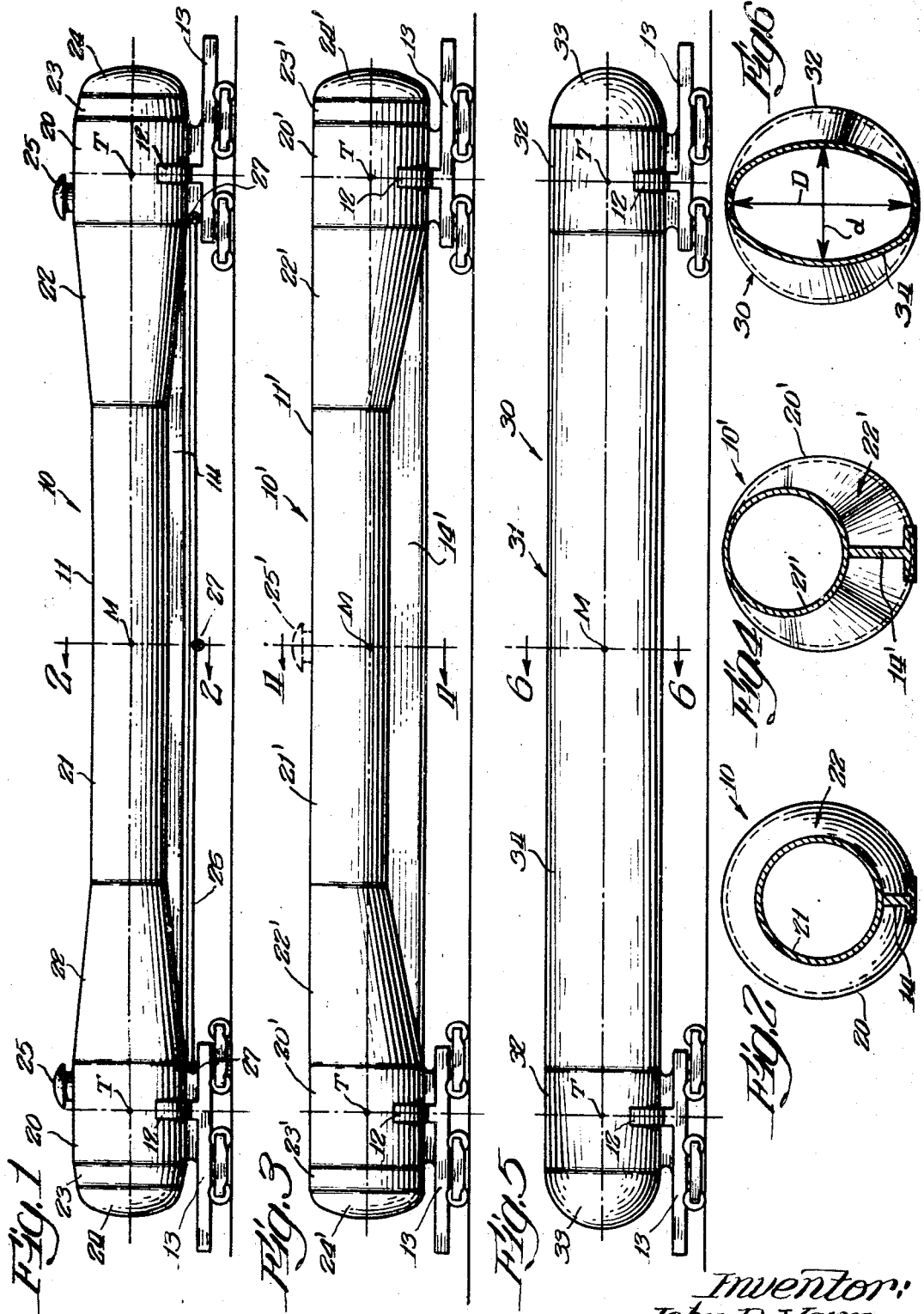

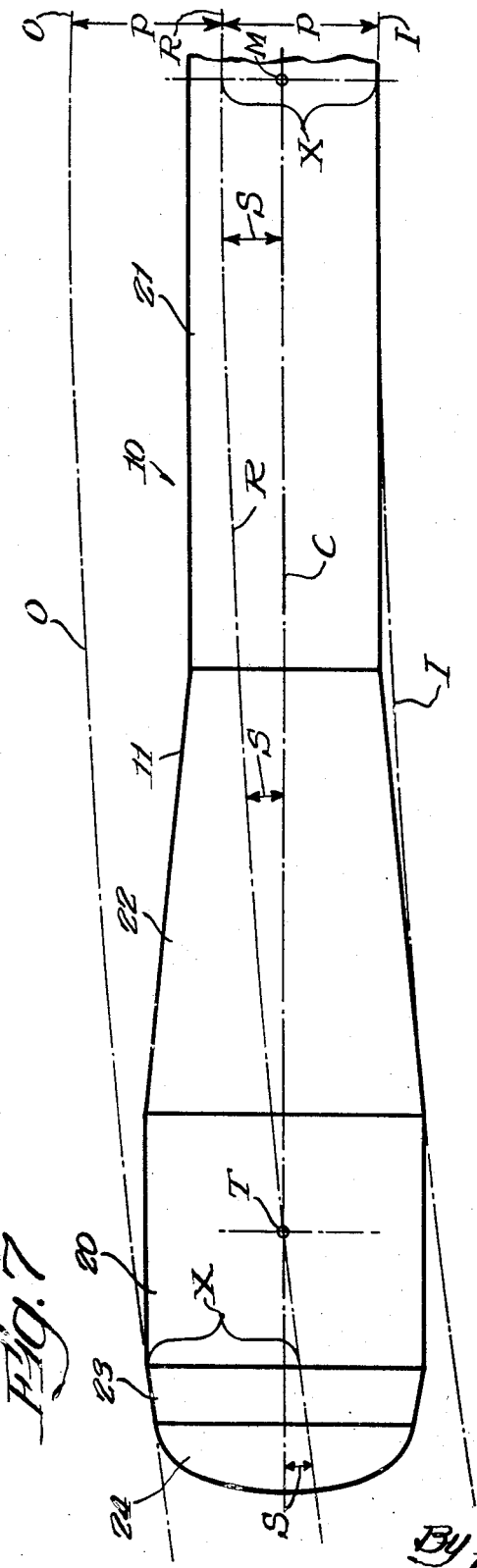
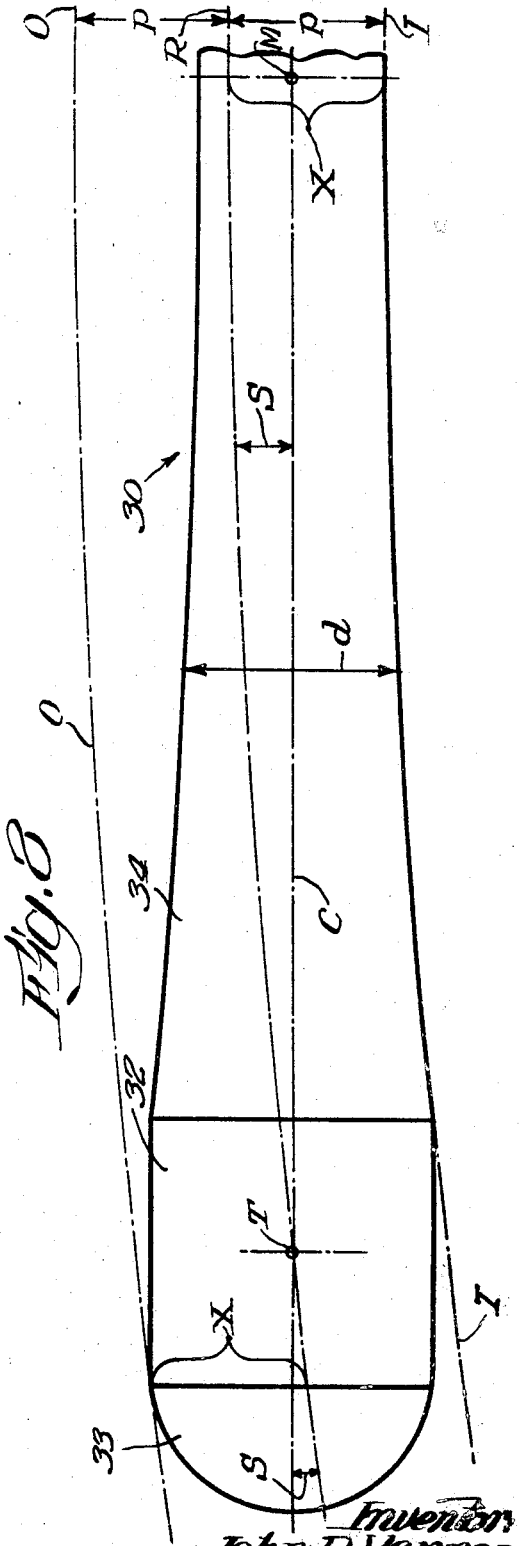

3,474,740
RAILWAY FREIGHT CAR
John D. Varnes, Hinsdale, Ill., assignor, by mesne assignments, to Union Tank Car Company, a corporation of Delaware
Filed Jan. 17, 1966, Ser. No. 521,083
Int. Cl. B61d 5/06
U.S. Cl. 105—360                              8 Claims

ABSTRACT OF THE DISCLOSURE

A railway material-handling car having a pair of longitudinally spaced wheel truck assemblies and a longitudinally extending car body mounted on and secured to the truck assemblies. In accordance with this invention, the width of the car body is selectively varied to substantially increase the volumetric carrying capacity of the body while maintaining the dimensions of the body within predetermined side clearance restrictions. In the preferred embodiment, the longitudinally extending car body comprises longitudinal end portions of relatively large width adjacent each of the truck assemblies and a central portion externally continuous with said end portions between said trucks and of relatively smaller width than the end portions. The widths of the end portions and central portion of said body are selectively varied along the length of the body to maintain the lateral projections of the body, particularly at the body center and ends, within a predetermined maximum lateral dimension as the railway car traverses a curvilinear path of travel.

---

This invention relates generally to improvements in railway freight cars, and more particularly relates to a railway freight car of novel configuration which permits the volumetric capacity of the car to be substantially increased.

As well known to those skilled in the art, the dimensional parameters of all types of railway freight-handling cars must be closely controlled so that the car may be used safely in interchange service over the right-of-ways of various railroads. In this regard, one of the most important design parameters which must be controlled to assure interchange usage of a freight car is the horizontal side clearance available as the car traverses a curve in the railway track. It is thus desirable that the horizontal projection of the sides of the freight car beyond the track be maintained within predetermined dimensional limits which provide the car with sufficient horizontal clearance, and which permit the car to remain in a stable condition, as the car passes around a track curve.

It is also well known to those skilled in the art that maximum horizontal side projection of a straight-sided freight car operating on a track curve occurs at the car center between the wheel trucks and at any longitudinally overhanging ends of the car because of swingout at these points, i.e., lateral displacement of the centerline of the car at the car center and ends from the track centerline. Regulation of the side projection of the freight car at these critical center and end points will therefore control the side clearance of the car.

In fact, the railroads concerned with interchange usage of freight cars have from time to time agreed upon standard car dimensions at these critical center and end points which provide the car with sufficient side clearance for use over various right-of-ways. For instance, members of the Association of American Railroads have presently defined the maximum side projection of the center and ends of freight cars intended for unrestricted interchange service as equivalent to the lateral center projection of a standard straight-sided car, 128 in. in width and 41 ft., 3 in. between wheel truck centers, when operating on a 13-degree (441 ft., 8⅜ in. radius) track curve. In such case the maximum swingout of the car centerline from the track centerline is 5¾ in., and the total permissible lateral or side projection of the car at the car center and ends (one-half the car width plus the swingout to these points), is 69¾ in. Standard dimensional limits for car height and rail clearances have also been prescribed, and other similar criteria have been set from time to time for more restricted freight car interchange service.

The above-described predetermined side clearance for freight cars, expressed in terms of the width-truck center relationship of a standardized straight-sided car, has heretofore presented a formidable barrier to the production of a freight car for interchange service having the volumetric capacity presently desired by the railroads and their customers. The principal cause of difficulty in this area is that, since the swingout of the car center and ends increases with an increase in distance between the trucks, any attempted lengthening of the truck center distance beyond that of the standardized car (41 ft., 3 in.) has required a reduction in the width of the entire car to a dimension less than the maximum width permitted for interchange service (e.g., 128 in.).

As a result of these design problems incident to adjustment of the length and width of freight cars, the carrying capacity of a car intended for unrestricted interchange service has heretofore been increased by substantially modifying principally the length and height of the car. In the tank car field, for instance, the volume of straight-sided tank cars has been increased by lengthening the truck center distance and extending the tank downwardly between the trucks to form a tank having what has become known as a "fish-belly" configuration.

In accordance with this invention, it has been found that the volumetric capacity of railway freight cars can be further increased while fully satisfying side clearance restrictions for interchange service by adjusting the car dimensions in a length-width frame of reference, i.e., by increasing the truck center distance of the car and providing the car with a width which varies along the length of the car. Hence, the various widths of the car, particularly at the critical center and end points, can be chosen so that the lateral projection of the car sides, while the car traverses a truck curve, does not exceed a predetermined maximum dimension.

It is therefore a prime object of this invention to provide a railway freight car of novel configuration and increased volumetric capacity.

It is a further object of this invention to provide a railway freight car of novel configuration having a varying width which permits the volumetric carrying capacity of the car to be substantially increased without violating any predetermined freight car side clearance restrictions.

It is a still further object of this invention to provide a railway freight car of novel configuration which can be readily dimensioned to satisfy predetermined side clearance restrictions while at the same time yielding substantially maximum volumetric capacity.

An additional object of this invention is to provide a railway freight car of varying width and increased volumetric capacity which is stable in operation and which can be readily constructed at relatively low cost.

Other objects and advantages of the present invention will become apparent from the following detailed description when considered in conjunction with the accompanying drawings wherein:

FIGURE 1 is an elevational view of a railway car embodying the present invention;

FIGURE 2 is a cross-sectional view of the car taken along the line 2—2 in FIGURE 1;

FIGURE 3 is an elevational view of a modification of the car shown in FIGURE 1;

FIGURE 4 is a cross-sectional view taken along the line 4—4 in FIGURE 3;

FIGURE 5 is an elevational view of another embodiment of a railway car in accordance with this invention;

FIGURE 6 is a cross-sectional view of the car taken along the line 6—6 in FIGURE 5;

FIGURE 7 is a fragmentary plan view of the car as illustrated in FIGURE 1; and

FIGURE 8 is a fragmentary plan view of the car as illustrated in FIGURE 5.

EXEMPLARY EMBODIMENT

Referring generally to these drawings, wherein several railway tank car embodiments are illustrated, it is apparent that this invention contemplates increasing the railway car volume by providing the car with a substantial length and a varying width which includes a relatively large preselected width at the car end portions adjacent the supporting wheel trucks and a smaller preselected width at the car center between the trucks. Of course, although the following detailed description is in reference to railway tank cars, it will be appreciated by those skilled in the art that this invention is equally applicable to provide other types of railway cars with substantially increased volumetric capacity.

Referring to FIGURE 1 more particularly, the freight-handling railway car 10 constructed in accordance with this invention comprises a longitudinally extending tank car body shell 11 which defines a fluid-tight enclosure for receiving the material to be transported. This tank body 11 is secured by suitable bolsters or saddle plates 12 to a pair of longitudinally-spaced wheel truck assemblies 13, and is preferably of rigid construction so that the tank is self-supporting without a continuous center sill. In this embodiment, suitable structural reinforcement for the longitudinal tank 11 is provided by the T-shaped structural member 14 extended between the trucks 13.

Referring to FIGURES 1 and 2, the tank body shell 11 comprises a pair of cylindrical end portions 20 of substantial diameter adjacent the trucks 13, and a cylindrical central portion 21 of relatively smaller diameter which is located centrally between the trucks 13. In addition, a pair of inwardly tapered frusto-conical transition sections 22 are secured such as by welding between the end portions 20 and the central portion 21 so that tank body 11 is a continuous structure.

This tank car 10 further includes an outwardly tapered frustro-conical section 23 and a conventional ellipsoidal tank head 24 at each end of the tank body 11. These sections 23 and heads 24 thus complete the tank enclosure, and provide the tank car with ends which overhang outwardly or longitudinally beyond the tank-supporting wheel truck assemblies 13.

Although not described in detail, the car 10 of course is to be provided with suitable draft gears, top fittings, platforms, and other conventional components typically employed in railway freight cars. For instance, the central portion 21 of the tank body 11 may be provided with a manway nozzle 25 for each end of the tank car, and suitable discharge piping 26 and valves 27 can be provided to permit the car 10 to be readily unloaded.

The railway freight-handling car 10 of the above-described construction therefore includes an elongated tank body 11 having a width which varies along the longitudinal length of the car. As described further hereinafter, the volumetric capacity of the tank body 11 in accordance with this invention thus can be increased by extending the distance between the trucks 13 of the desired amount, and then selecting values for the width of the tank end portions 20 and central portion 21 which provide the car 10 with the desired amount of horizontal side clearance.

The modified railway tank car 10′ as shown in FIGURE 3 is substantially similar to the tank car 10 illustrated in FIGURE 1, and likewise comprises a pair of large diameter cylindrical end portions 20′ joined to the smaller diameter central cylindrical portion 21′. However, the central section 21′ is raised in this embodiment, and the tank car 10′ is provided with offset conical transition sections 22′, as compared to the right conical sections 22 of the car embodiment 10. This tank car 10′ is further provided with a cylindrical section 23′ at the car ends in place of the previously described outwardly tapered conical sections 23. Since the volume of offset conical sections 22′ is substantially the same as the volume of the right conical sections 22, the volume of the modified tank car 10′ experiences no net change as a consequence of raising the central cylindrical portion 21′. However, this modification is advantageous in that it aligns the tops of all portions of the car 10′ in one elimination of duplicate tank top fittings such as the manway nozzle 25′.

The railway tank car 30, as illustrated in FIGURES 5 and 6, is an additional embodiment of a freight-handling car in accordance with this invention. Referring to FIGURE 5, this tank car 30 comprises a fluid tight body shell 31 including cylindrical end portions 32 of substantial diameter. These large end portions 32 are also positioned adjacent the longitudinally-spaced wheel trucks 13, and are each closed at the overhanging outer end by a torispherical tank head 33. The tank body shell 31 further includes an elongated central portion 34 which is extended centrally between the wheel trucks 13 and which is joined, such as by welding, to the cylindrical end portions 32 so that the body shell 31 defines a complete enclosure.

As clearly illustrated in FIGURE 6, the central portion 34 of this tank car 30 is constructed from a tubular member of elliptical cross-section having a substantially vertical major diameter D and a substantially horizontal minor diameter $d$. This major diameter D is preferably maintained substantially equal to the diameter of the cylindrical end portions 32 throughout the length of the central portion 34, as shown in FIGURE 5. On the other hand, the minor diameter $d$ is varied along the length of central portion 34, from a maximum preselected dimension equal to major diameter D adjacent the cylindrical end tank portions 32 to a minimum preselected dimension at the midpoint of the tank car between the wheel trucks 13. By this arrangement, the tank car 30 is provided with a substantially uniform height which increases the volumetric capacity of the car, and the width of the car between wheel trucks 13 can be varied to maintain the lateral projection of the car within a predetermined dimensional limit.

The manner in which the varying widths of freight cars in accordance with this invention may be preselected will be described with reference to the plan views of FIGURES 7 and 8, which illustrate various car embodiments in place upon a railway track curve having a track centerline R. In these FIGURES 7 and 8, the arcs I and O, parallel to track centerline R and evenly spaced a predetermined lateral distance P therefrom, represent inner and outer clearance curves, respectively, within which the freight car may be moved without violating pre-set side clearance restrictions. Therefore, this distance P defines the predetermined maximum lateral projection of either side of the car which may occur at any point along the length of the freight car when operating on the track curve.

Referring to FIGURE 7 in more detail, one of the symmetrical halves of the tank car 10, previously described with reference to FIGURE 1, is shown placed along the track centerline R. The centerline C of car 10 hence intersects the track centerline R at point T which is the center of wheel truck 13 (FIG. 1) about which car 10 will laterally rotate or swing out as the car traverses the track curve. As apparent from FIGURE 7, this rotation or swingout, i.e., the lateral displacement of car centerline C from track centerline R, increases in proportion to an increased longitudinal distance along the car from the truck center T, and reaches a maximum dimension at the midpoint M of the car 10. This swingout, generally indicated by the dimension S in FIGURE 7, thus varies along the length of car 10, from a minimum dimension adjacent the truck center T to a maximum at the car midpoint M.

From an examination of FIGURE 7, it is also apparent that the lateral projection of the sides of car 10 beyond the track centerline R is equal to the sum of one-half the car width at any point along the car length plus the swingout at that point. FIGURE 7 further illustrates that this lateral swingout is maximum at the center and overhanging ends of the car 10 (i.e., the dimension X). The lateral projection of car 10 can thus be maintained within the predetermined maximum P, defined by clearance curves I and O, by selecting the varying widths of the car so that this side projection (one-half the car width thus swingout) at any point does not exceed the dimension P, i.e., the width of the car 10 is reduced as the swingout S increases. Accordingly, the width of the central portion 21 of the tank car 10 at the car center or midpoint M is a preselected minimum dimension because of maximum swingout S at that point, and the width of the car end portion 20 adjacent the truck center T is a preselected maximum dimension, since the car swingout adjacent the truck is minimum. The truck center length (T—T in FIGURE 1) of the car 10 can thus be selected so that this maximum width of the end portions 20 adjacent the car trucks 13 can be extended to the maximum width permissible, e.g., 128 inches as presently specified for unrestricted interchange service.

The same above-described criteria are employed to preselect the varying widths of the tank car 30 having an elliptical central portion 34, illustrated in FIGURES 5, 6 and 8. In this regard, the minor diameter $d$ of the elliptical portion 34 is gradiently varied from a preselected minimum at the midpoint M of tank 34 to a preselected maximum at the end portions 32 adjacent the truck center T, as shown in FIGURE 8. The provision of this elliptical central tank portion 34 is advantageous because the minor diameter $d$ can be gradiently adjusted so that the sides of the tank car 30 closely parallel the inside clearance curve I. Hence, the volumetric capacity of the tank car 30 can be increased substantially by extending the various widths of the central portion 34 to the maximum lateral distance permitted by prevailing side clearance requirements.

From the above description, it will be appreciated that the width and length of a freight car constructed in accordance with this invention can be selected to provide the car with a substantially increased volumetric capacity. Further, by providing the freight car with a relatively large width adjacent the supporting trucks and a relatively smaller width between truck centers, as contemplated by this invention, it is apparent that this increased volumetric capacity can be realized without violating any predetermined side clearance restrictions.

As an example of a constructional embodiment of this invention which will satisfy the above-noted side clearance requirements for unrestricted interchange freight car service (i.e., a maximum 69¾ inch lateral car projection when operating on a 13 degree track curve; and 128 inch maximum car width) the tank car 10, as illustrated in FIGURES 1, 2 and 7, may have the following specifications:

| | |
|---|---|
| Distance between centers T of trucks 13 | 89 ft., 0 in. |
| Over-all distance between tank heads 24 | 108 ft., ¼ in. |
| Length of central portion 21 | 46 ft., 0 in. |
| Width (outside diameter) of central portion 21 | 85 in. |
| Length of transitional sections 22 | 17 ft., 0 in. |
| Length of large end portions 20 | 9 ft., 6 in. |
| Width (outside diameter) of end portions 20 | 128 in. |
| Length of conical sections 23 | 2 ft., ⅛ in. |
| Outside diameter of heads 24 | 122 in. |

The approximate volumetric capacity of this above constructional embodiment is 45,500 gallons as contrasted to a volumetric capacity of 30,650 gallons for a conventional cylindrical straight-sided tank car of equal length having the maximum width permitted for unrestricted side clearance service.

It will be appreciated by those skilled in the art that the foregoing description is merely illustrative of this invention, and that various modifications of the aforementioned railway freight car may be devised without departing from the scope of this invention.

What is claimed is:

1. In a railway material-handling car having a pair of longitudinally spaced wheel truck assemblies for supporting the car, the improvement comprising a longitudinally extending car body mounted on and secured to said truck assemblies and defining a storage housing of varying width adapted for receiving and storing the material to be transported throughout substantially the entire length of said car body, said body comprising longitudinal end portions of relatively large width adjacent each of said truck assemblies and a central portion joined to said end portions between said trucks and of relatively smaller width than said end portions, said car body having a predetermined maximum lateral dimension at said end portions and further having a predetermined minimum lateral dimension adjacent the center of said central portion between said truck assemblies, the width of said body being selectively varied along the length thereof to maintain the lateral projection of said body within a predetermined maximum lateral dimension as said car traverses a curvilinear path of travel, whereby the length and varying width of said car are such that a substantial increase in the volumetric capacity of the storage housing defined by said car body is achieved while maintaining said car within predetermined side clearance restrictions.

2. The railway material-handling car in accordance with claim 1 wherein said end portions of said car body project longitudinally outwardly beyond the adjacent wheel truck assembly so that the outer extremities of said end portions project laterally as said car traverses a curvilinear path of travel, and wherein the width of said end portions at said extremities is selected to be the maximum width permissible for maintaining the lateral projection of said extremities within predetermined side clearance restrictions.

3. A railway material-handling car in accordance with claim 1 wherein said width of said central portion varies gradiently along the length of said central portion from said minimum lateral dimension to said maximum lateral dimension.

4. In a railway tank car having a pair of longitudinally spaced wheel truck assemblies for supporting the car, a longitudinally extending tubular body shell defining a substantially fluid-tight enclosure mounted on and secured to said truck assemblies, said body shell comprising a substantially cylindrical central section of relatively small width positioned inwardly between said truck assemblies and a substantially cylindrical end section of relatively large width positioned adjacent each of said truck assemblies, said body shell further including an inwardly tapering frusto-conical transition section joined between said central section and each of said end sections so that said body shell comprises an externally continuous tubular structure, said widths of said central section and said end sections being selectively varied to maintain the lateral projection of said car within a predetermined maximum lateral dimension as said car traverses a curvilinear path of travel, whereby the length and varying width of said body shell are such that a substantial increase in the volumetric capacity of said tank car is achieved while maintaining said car within predetermined side clearance restrictions.

5. The railway tank car in accordance with claim 4 wherein the top portions of said central section and said conical transition sections are in substantial horizontal alignment with the top portion of said end sections so that the top of said body shell is disposed in a substantially horizontal plane.

6. In a railway tank car having a pair of longitudinally spaced wheel truck assemblies for supporting the car, a longitudinally extending tubular body shell defining a substantially fluid-tight enclosure mounted on and secured to said truck assemblies, said body shell including an end section of relatively large width positioned adjacent each of said truck assemblies and further including a central section of varying width extended between said truck assemblies and joined to said end sections so that said body shell comprises an externally continuous tubular structure, said width of said end sections and said varying widths of said central section being selectively varied along the length of said body shell to provide said body shell with a minimum predetermined lateral dimension adjacent the center of said central section between said truck assemblies and a predetermined maximum lateral dimension adjacent each of said truck assemblies.

7. A railway tank car according to claim 6 wherein said central section comprises an elongated elliptical body having a substantially vertical major diameter and a substantially horizontal minor diameter, and wherein said minor diameter is varied gradiently along the length of said central section from a predetermined minimum lateral dimension adjacent the center of said central section to a predetermined maximum dimension adjacent each of said truck assemblies.

8. The invention according to claim 7 wherein said major diameter is maintained substantially constant along the length of said central section.

References Cited

UNITED STATES PATENTS

| | | | |
|---|---|---|---|
| 2,318,863 | 5/1943 | Jabelmann | 105—2 |
| 2,933,053 | 4/1960 | Mellam | 105—368 |
| 2,950,690 | 8/1960 | Bohlen | 105—368 |
| 3,277,842 | 10/1966 | Schwartz et al. | 105—358 |
| 3,277,843 | 10/1966 | Horner et al. | 105—360 |

OTHER REFERENCES

"Report on Assignment 6," in American Railway Engineering Association Bulletin, vol. 62, No. 561, December 1960.

DRAYTON E. HOFFMAN, Primary Examiner